(12) United States Patent
Deguchi et al.

(10) Patent No.: US 6,452,721 B2
(45) Date of Patent: Sep. 17, 2002

(54) METHOD, DEVICE, AND SYSTEM FOR EVALUATING CHARACTERISTICS OF OPTICAL FIBER TRANSMISSION LINE

(75) Inventors: Hiroyuki Deguchi; Shin-ichirou Harasawa, both of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/769,522

(22) Filed: Jan. 26, 2001

(30) Foreign Application Priority Data

Jun. 13, 2000 (JP) .................................... 2000-176629

(51) Int. Cl.[7] ................... H04B 10/12; H04B 10/02; H01S 3/00

(52) U.S. Cl. ..................... 359/341.33; 359/341.3; 359/334; 359/177

(58) Field of Search .................... 359/341.4, 341.33, 359/110, 333, 341.3, 334, 177; 356/73.1

(56) References Cited

U.S. PATENT DOCUMENTS

| | | | |
|---|---|---|---|
| 4,391,517 A | * 7/1983 | Zucker et al. | 250/227.11 |
| 4,652,123 A | * 3/1987 | Neumann | 356/73.1 |
| 5,074,633 A | * 12/1991 | Cohen et al. | 359/337 |
| 5,216,728 A | * 6/1993 | Charlton et al. | 372/6 |
| 5,357,332 A | * 10/1994 | Chappel | 356/73.1 |
| 5,455,672 A | * 10/1995 | Lamonde et al. | 356/73.1 |
| 5,461,497 A | * 10/1995 | Mackichan | 359/177 |
| 5,471,342 A | * 11/1995 | Junginger et al. | 359/177 |
| 5,847,862 A | 12/1998 | Chraplyvy et al. | 359/337 |
| 6,201,620 B1 | * 3/2001 | Anhorn | 359/110 |
| 6,222,652 B1 | * 4/2001 | Roberts | 359/110 |
| 6,271,962 B1 | * 8/2001 | Choi | 359/179 |
| 6,317,255 B1 | * 11/2001 | Fatehi et al. | 359/177 |
| 6,337,936 B1 | * 1/2002 | Yoneyama | 385/24 |

FOREIGN PATENT DOCUMENTS

| | | |
|---|---|---|
| JP | 10022931 A | 1/1998 |
| JP | 10073852 A | 3/1998 |
| JP | 10200509 A | 7/1998 |
| JP | 10294510 A | 11/1998 |

OTHER PUBLICATIONS

Takahara, M. et al. "Splice Effects of Er–doped Fiber in Er–Doped Fiber Amplifiers." ICCS/'94. 1994, pp. 73–77.*
Zheng, W. et al. "Erbium–Doped Fiber Splicing and Splice Loss Estimation." J. Lightwave Tech. 12:3, Mar. 1994, pp. 430–435.*
Seo, H.K. et al. Gain and noise figure improvement of erbium–doped fiber amplifiers by optimizing spectral splicing conditions. OFC'98 Technical Digest, pp. 236–238.*

* cited by examiner

Primary Examiner—Thomas H. Tarcza
Assistant Examiner—Andrew R. Sommer
(74) Attorney, Agent, or Firm—Staas & Halsey, LLP

(57) ABSTRACT

An optical amplifier including a pumping source for supplying pump light to an optical fiber transmission line is provided so that at least a part of the optical fiber transmission line produces Raman amplification to an optical signal. An optical filter unit for selectively switching between a first condition where the optical signal and the pump light are passed and a second condition where the optical signal is passed and the pump light is not passed is connected between the optical fiber transmission line and the optical amplifier. The power of the optical signal in the first condition is compared with that in the second condition, and the characteristics of the optical fiber transmission line, such as a splice loss therein, is evaluated according to the result of this comparison. In the second condition, the residual pump light is not supplied to the optical fiber transmission line, so that a measurement error due to Raman amplification can be eliminated to thereby allow accurate evaluation of the characteristics of the optical fiber transmission line.

9 Claims, 17 Drawing Sheets

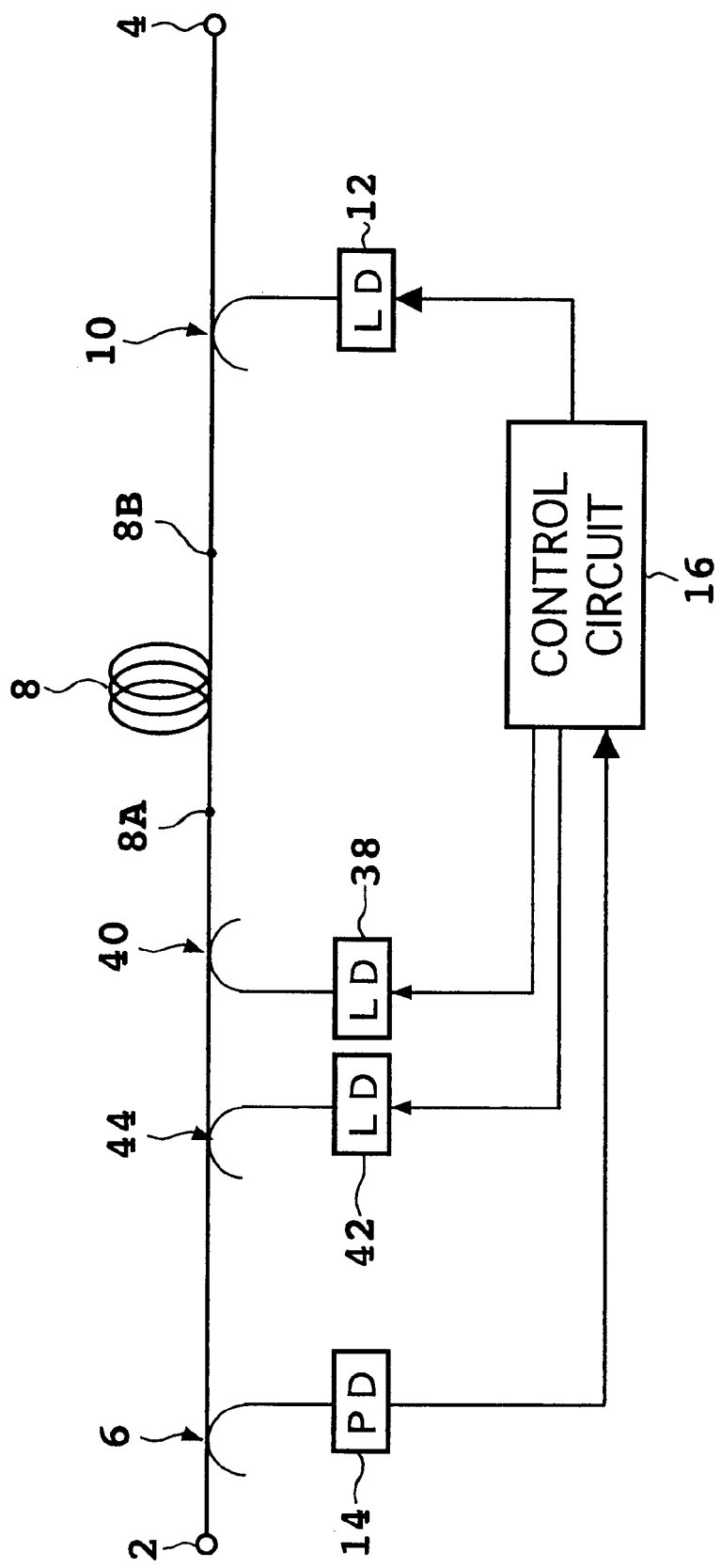

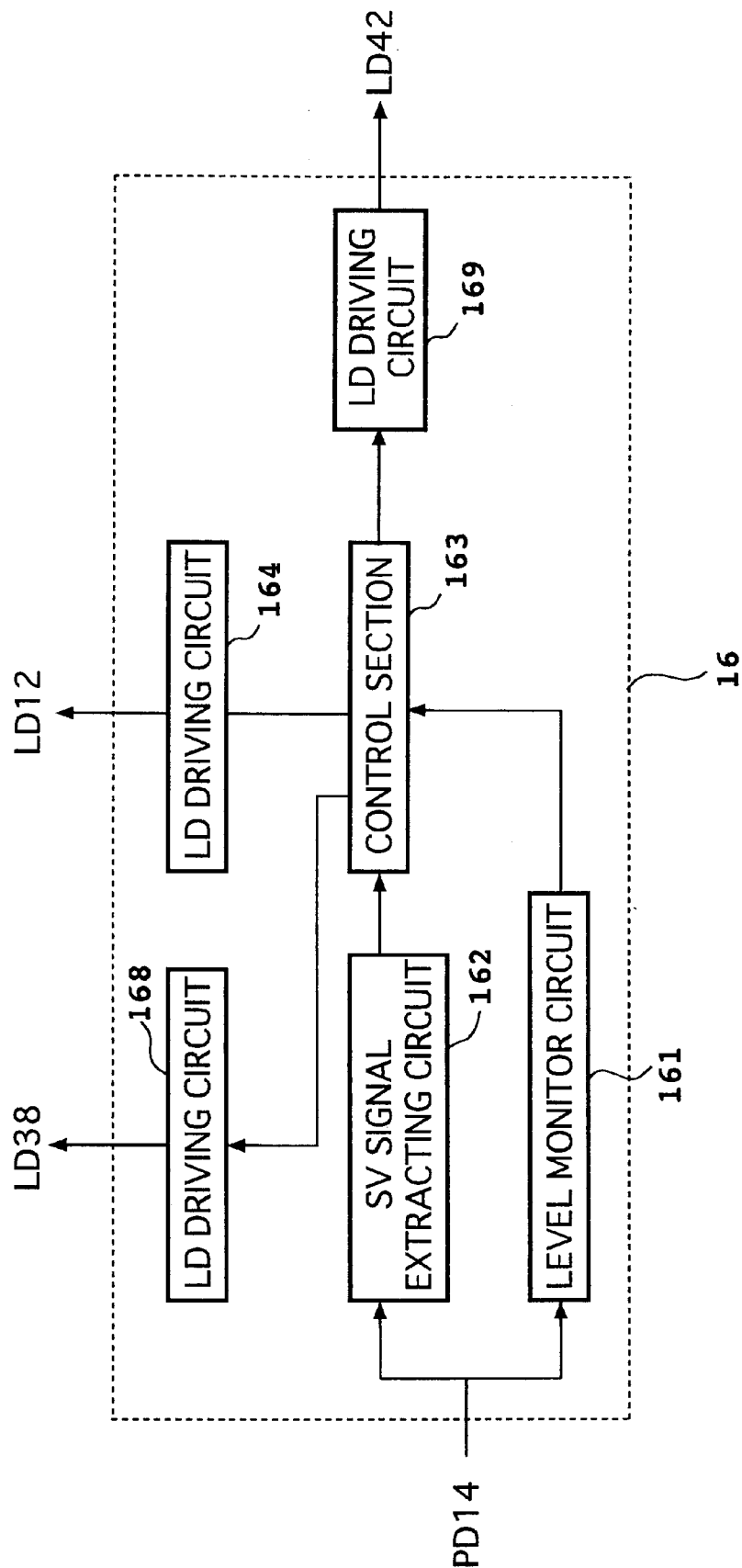

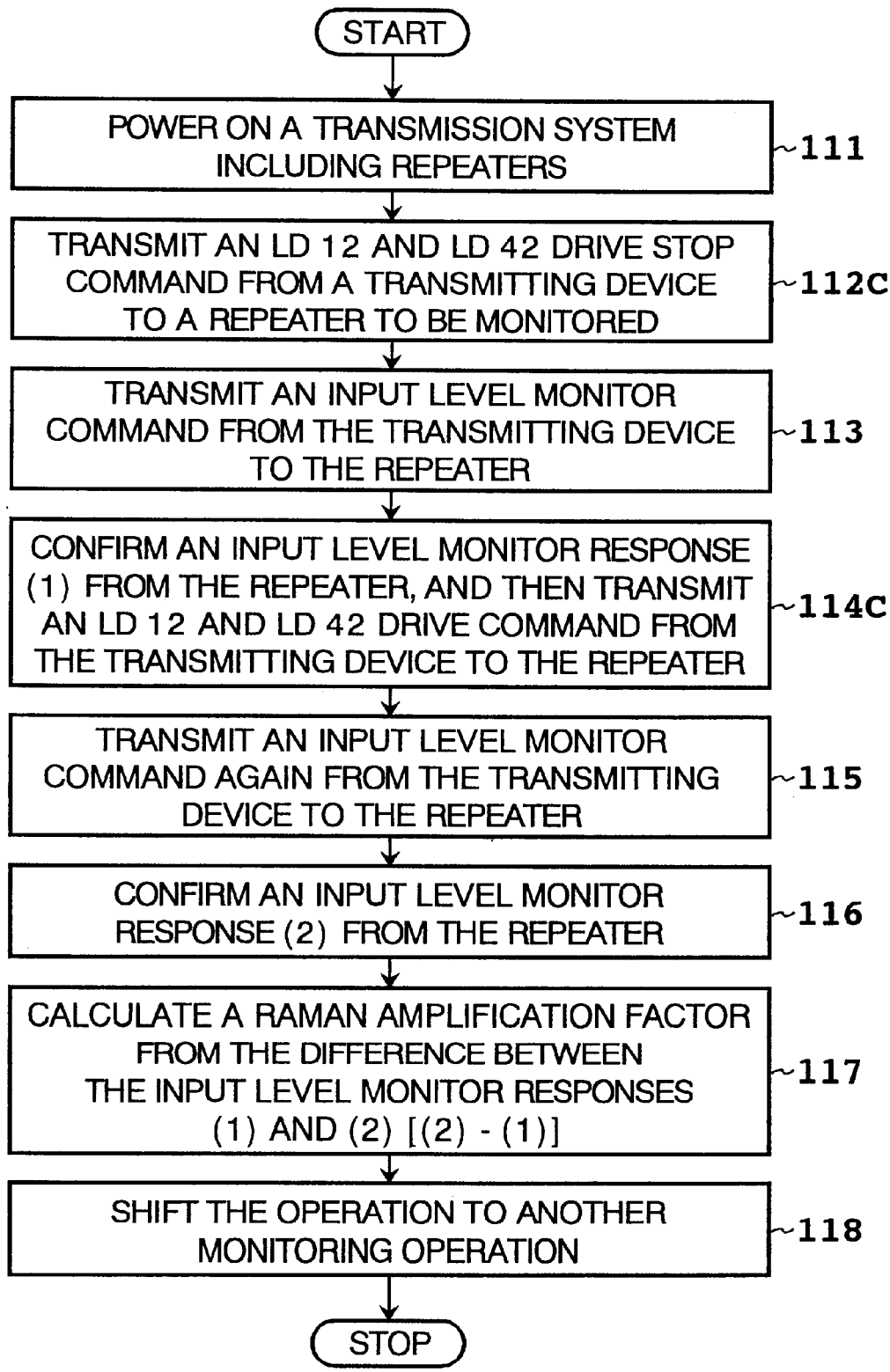

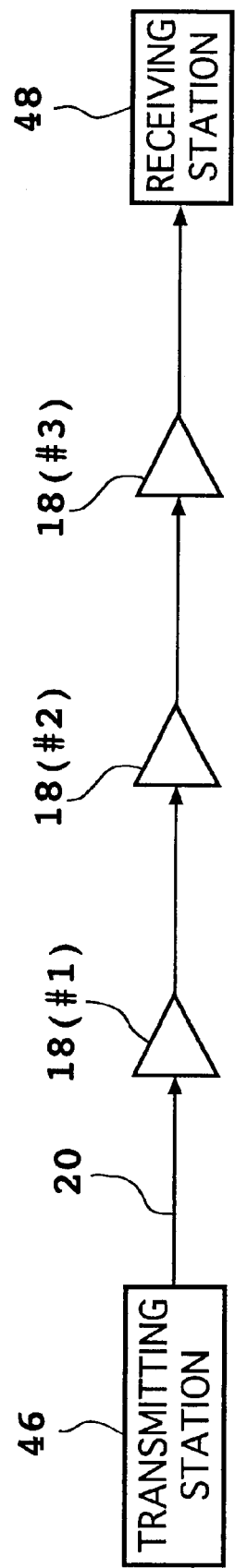

F I G. 1 6
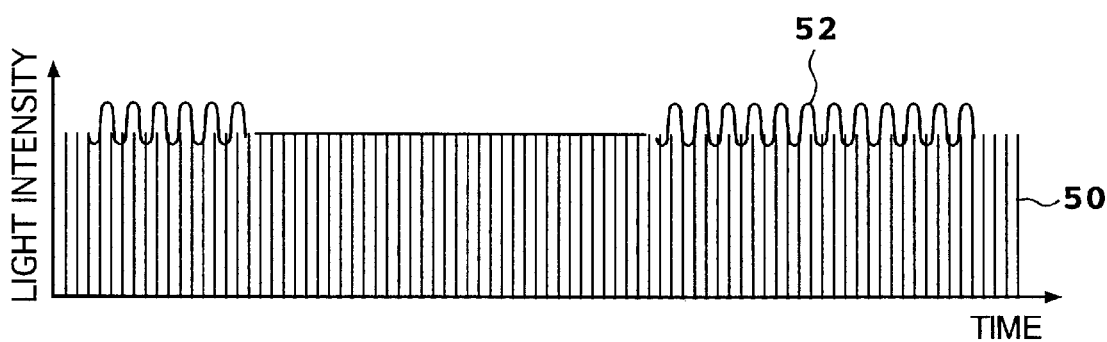

METHOD, DEVICE, AND SYSTEM FOR EVALUATING CHARACTERISTICS OF OPTICAL FIBER TRANSMISSION LINE

BACKGROUND OF THE INVENTION

1. Field of the Invention

The present invention relates to a method, device, and system for evaluating the characteristics of an optical fiber transmission line, such as a loss at an optical fiber connection point.

2. Description of the Related Art

Methods of manufacturing and using a low-loss (e.g., 0.2 dB/km) optical fiber (e.g., silica fiber) have been established, and an optical fiber transmission system using the optical fiber as a transmission line has been put to practical use. Further, to compensate for losses in the optical fiber transmission line, one or more optical amplifiers for amplifying an optical signal are arranged along the optical fiber transmission line.

An optical amplifier known in the art includes an optical amplifying medium for propagating an optical signal, and a pumping source for pumping the optical amplifying medium so that the optical amplifying medium provides a gain in the optical signal. For example, an erbium doped fiber amplifier (EDFA) has an erbium doped fiber (EDF) as the optical amplifying medium, and the EDF is pumped by a pump light having a wavelength included in a 0.98-$\mu$m band or a 1.48-$\mu$m band.

In recent years, Raman amplification is sometimes utilized to obtain an additional gain in a system having an optical amplifier in the middle of an optical fiber transmission line. In general, when light having large power is supplied to an optical fiber, a relatively wide gain band is generated by the effect of Raman amplification at wavelengths longer than the wavelength of the light. For example, when light having a wavelength included in a 1.45 to 1.48 $\mu$m band and having a power larger than +0 dBm is supplied to a silica fiber, a gain band providing a gain of about 0.1 to 8 dB is generated at wavelengths longer than t he wavelength (1.55-$\mu$m band) of in put light by 0.009 to 0.10 $\mu$m.

In improving the efficiency of generation of Raman amplification, it is effective to increase the power of light input into an optical fiber or to use an optical fiber having a small mode field diameter. Conversely, the gain by Raman amplification changes with a change in either the power of input light or the mode field diameter of an optical fiber.

It is difficult to accurately grasp the mode field diameter of an optical fiber used as an optical fiber transmission line from the viewpoint of a method of manufacturing . Further, the power and wavelength of light input to an optical fiber transmission line to produce Raman amplification differ according to systems. Accordingly, in the case of evaluating the characteristics of an optical fiber transmission line, such as a loss at a splice connection point on the optical fiber transmission line, there is a possibility of large errors due to variations in gain by Raman amplification.

In the case that the loss by splice connection is high, the connection of optical fibers may be imperfect, causing a possibility of breaking of the transmission line due to aged deterioration or shock against a cable.

Such imperfect connection of optical fibers causes a fatal defect in a system required to have the long-term reliability of a cable, such as in a submarine communication system.

SUMMARY OF THE INVENTION

It is therefore an object of the present invention to provide a method, device, and system for accurately evaluating the characteristics of an optical fiber transmission line.

In accordance with the present invention, there is provided a first method for evaluating the characteristics of an optical fiber transmission line. In this method, an optical amplifier comprising a pumping source for supplying pump light to the optical fiber transmission line is provided so that at least a part of the optical fiber transmission line produces Raman amplification to an optical signal. An optical filter unit for selectively switching between a first condition where the optical signal and the pump light are passed and a second condition where the optical signal is passed and the pump light is not passed is connected between the optical fiber transmission line and the optical amplifier. The power of the optical signal in the first condition is compared with that in the second condition, and the characteristics of the optical fiber transmission line are evaluated according to the result of this comparison.

According to this method, Raman amplification does not occur in the second condition, so that a measurement error due to variations in gain by Raman amplification can be eliminated to thereby attain the object of the present invention.

In accordance with the present invention, there is provided a device suitable for carrying out the first method. This device comprises an optical amplifier comprising a pumping source for supplying pump light to an optical fiber transmission line so that at least a part of the optical fiber transmission line produces Raman amplification to an optical signal; an optical filter unit connected between the optical fiber transmission line and the optical amplifier for selectively switching between a first condition where the optical signal and the pump light are passed and a second condition where the optical signal is passed and the pump light is not passed; and a control circuit for controlling the optical filter unit so as to switch between the first condition and the second condition.

In accordance with the present invention, there is provided a system suitable for carrying out the first method. This system comprises an optical fiber transmission line for propagating an optical signal; an optical amplifier comprising a pumping source for supplying pump light to the optical fiber transmission line so that at least a part of the optical fiber transmission line produces Raman amplification to the optical signal; an optical filter unit connected between the optical fiber transmission line and the optical amplifier for selectively switching between a first condition where the optical signal and the pump light are passed and a second condition where the optical signal is passed and the pump light is not passed; and a control circuit for controlling the optical filter unit so as to switch between the first condition and the second condition.

In accordance with the present invention, there is provided a second method for evaluating the characteristics of an optical fiber transmission line. In this method, first and second optical amplifiers are connected to a first end and a second end of the optical fiber transmission line, each of the first and second optical amplifiers comprising a doped fiber (e.g., EDF) doped with a rare earth element, a first pumping source connected to a first end of the doped fiber for outputting first pump light, and a second pumping source connected to a second end of the doped fiber for outputting second pump light. Switching is performed between a first condition where the first and second pumping sources of the first optical amplifier are turned off and on, respectively, and the first and second pumping sources of the second optical amplifier are turned on and off, respectively, and a second condition where the first and second pumping sources of the first optical amplifier are turned on, and the first and second pumping sources of the second optical amplifier are turned on. The power of the optical signal in the first condition is measured, and the characteristics of the optical fiber transmission line are evaluated according to the result of this measurement.

According to this method, a measurement error due to variations in gain by Raman amplification can be eliminated in the first condition, thereby attaining the object of the present invention.

In accordance with the present invention, there is provided a device suitable for carrying out the second method. This device comprises first and second optical amplifiers each comprising a doped fiber doped with a rare earth element, a first pumping source connected to a first end of the doped fiber for outputting first pump light, and a second pumping source connected to a second end of the doped fiber for outputting second pump light; and a control circuit for switching between a first condition where the first and second pumping sources of the first optical amplifier are turned off and on, respectively, and the first and second pumping sources of the second optical amplifier are turned on and off, respectively, and a second condition where the first and second pumping sources of the first optical amplifier are turned on, and the first and second pumping sources of the second optical amplifier are turned on, according to a supervisory signal.

In accordance with the present invention, there is provided a system suitable for carrying out the second method. This system comprises first and second optical amplifiers each comprising a doped fiber doped with a rare earth element, a first pumping source connected to a first end of the doped fiber for outputting first pump light, and a second pumping source connected to a second end of the doped fiber for outputting second pump light; an optical fiber transmission line having a first end and a second end respectively connected to the first and second optical amplifiers; and a control circuit for switching between a first condition where the first and second pumping sources of the first optical amplifier are turned off and on, respectively, and the first and second pumping sources of the second optical amplifier are turned on and off, respectively, and a second condition where the first and second pumping sources of the first optical amplifier are turned on, and the first and second pumping sources of the second optical amplifier are turned on, according to a supervisory signal.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 12 is a block diagram showing a fourth preferred embodiment of the device according to the present invention;

FIG. 13 is a block diagram showing a specific configuration of a control circuit in the fourth preferred embodiment;

FIG. 14 is a flowchart of supervisory control in the fourth preferred embodiment;

FIG. 15 is a block diagram showing a first preferred embodiment of the system according to the present invention;

FIG. 16 is a graph for illustrating a transmitting method for a supervisory signal.

DETAILED DESCRIPTION OF THE PREFERRED EMBODIMENTS

Figure 1:
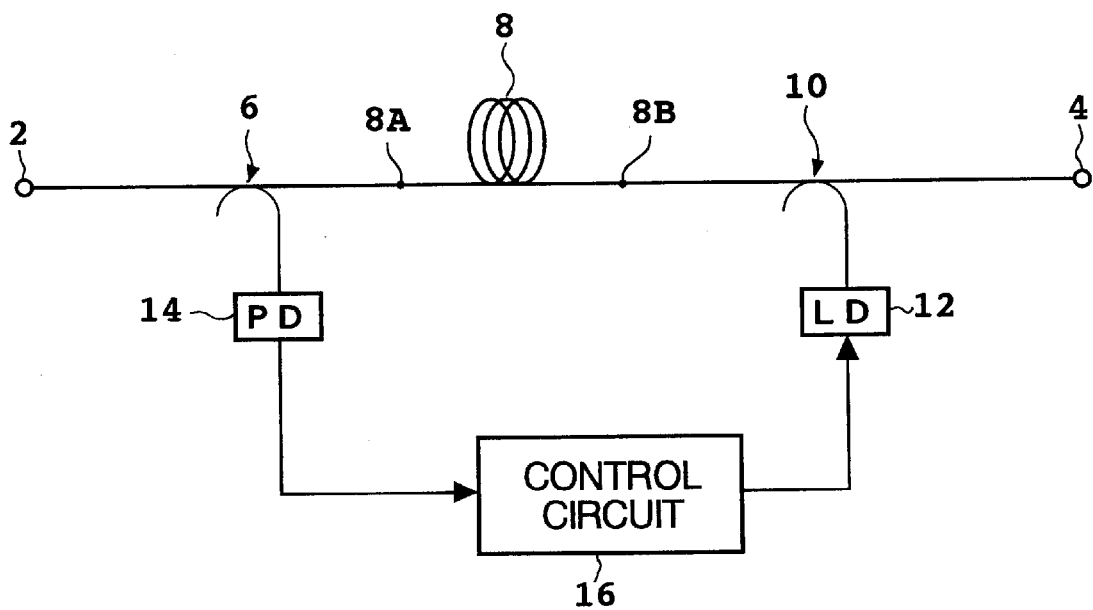
FIG. 1 is a block diagram showing a conventional optical repeater.

Some preferred embodiments of the present invention will now be described in detail with reference to the attached drawings. Throughout the drawings, substantially the same parts are denoted by the same reference numerals.

Referring to FIG. 1, the configuration of a conventional optical amplifier that is usable as an optical repeater is shown. The optical amplifier shown in FIG. 1 has an input port 2 and an output port 4. An optical coupler 6, an erbium doped fiber (EDF) 8 as an optical amplifying medium, and an optical coupler 10 are connected between the input port 2 and the output port 4. The EDF 8 has a first end 8A and a second end 8B.

A laser diode (LD) 12 as a pumping source is connected to the optical coupler 10, so that pump light output from the laser diode 12 is supplied through the optical coupler 10 into the EDF 8 from its second end 8B. An optical signal to be amplified is supplied from the input port 2 through the optical coupler 6 into the EDF 8 from its first end 8A. When the optical signal is supplied into the EDF 8 being pumped by the pump light, the optical signal is amplified on the principle of stimulated emission. The optical signal thus amplified is passed through the optical coupler 10 and output from the output port 4.

A photodetector (PD) 14 is connected to the optical coupler 6, so as to monitor the power of the input optical signal. The photodetector 14 outputs an electrical signal reflecting the power of the input optical signal. This electrical signal is supplied to a control circuit 16. The control circuit 16 controls the power of the pump light to be output from the laser diode 12 so that a proper gain according to the input power of the optical signal is obtained in this optical amplifier.

Residual pump light having not contributed to the optical amplification in the EDF 8 is passed through the first end 8A and the optical coupler 6 and output from the input port 2 in a direction opposite to the propagation direction of the optical signal. This residual pump light output from the input port 2 caused Raman amplification in an optical fiber transmission line connected to the input port 2.

The wavelength of the optical signal is included in a 1.55-$\mu$m band (1.50 to 1.60 $\mu$m), and the wavelength of the pump light is included in a 1.48-$\mu$m band (1.46 to 1.50 $\mu$m). By such a wavelength setting, an effective gain for the optical signal can be generated in the EDF 8, and the above-mentioned Raman amplification can also be generated in the optical fiber transmission line.

Figure 2:
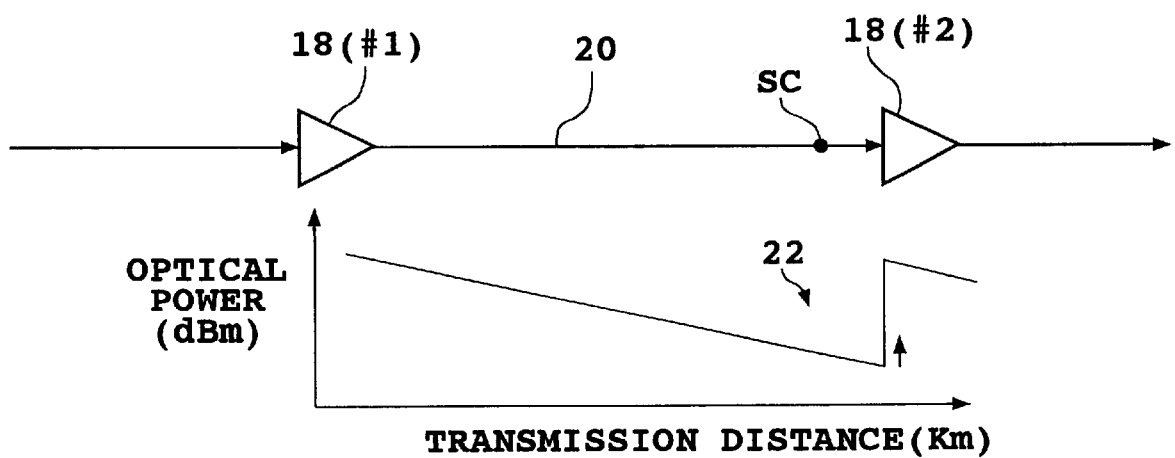
FIG. 2 is a block diagram showing a general optical fiber transmission system in relation to its power diagram.

Referring to FIG. 2, the configuration of a general optical fiber transmission system and a power diagram in this system are shown. This system includes an optical fiber transmission line 20 and a plurality of (e.g., two as shown) optical repeaters 18(#1) and 18(#2) arranged along the optical fiber transmission line 20, thereby compensating for losses in the optical fiber transmission line 20. In the power diagram representing the relation between optical power (dBm) and transmission distance (km), the optical power of an optical signal propagating in the optical fiber transmission line 20 linearly attenuates with the transmission distance in the case that Raman amplification is not considered. When residual pump light is supplied from the optical repeater 18(#2) to the optical fiber transmission line 20 toward the optical repeater 18(#1), a gain by Raman amplification is obtained near the input of the optical repeater 18(#2) as shown by reference numeral 22 in the power diagram.

Such a gain by Raman amplification varies with the power of the residual pump light leaking from the optical repeater 18(#2) and the mode field diameter of an optical fiber used as the optical fiber transmission line 20, so that there is a case that a loss at a splice connection point SC of the optical fiber transmission line 20 on the input side of the optical repeater 18(#2) cannot be accurately measured, for example. In this case, it is difficult to accurately determine whether or not the splicing work has been well done, causing a possibility of serious trouble from the viewpoint of quality control. To cope with this problem, the residual pump light leaking from the optical repeater 18(#2) may be suppressed. In this case, however, the gain to be obtained by Raman amplification is lost, and this method is therefore useless in view of the operation of the system as a whole.

If Lsp denotes the loss at the splice connection point SC, Pincabl denotes the power of an optical signal output from the optical repeater 18(#1) to the optical fiber transmission line 20, Lcabl denotes the loss in the optical fiber transmission line 20 between the optical repeaters 18(#1) and 18(#2), Gram denotes the gain by Raman amplification, and Pinrep denotes the input power to the optical repeater 18(#2), the following equation holds:

Pincabl−Lcabl+Gram−Lsp=Pinrep

In the above equation, Pincabl, Lcabl, and Pinrep can be easily determined in advance by measurement, and Lsp is to be measured in the splicing work. The measurement accuracy of Lsp is reduced because Gram cannot be accurately determined because of its variations.

Figure 3:
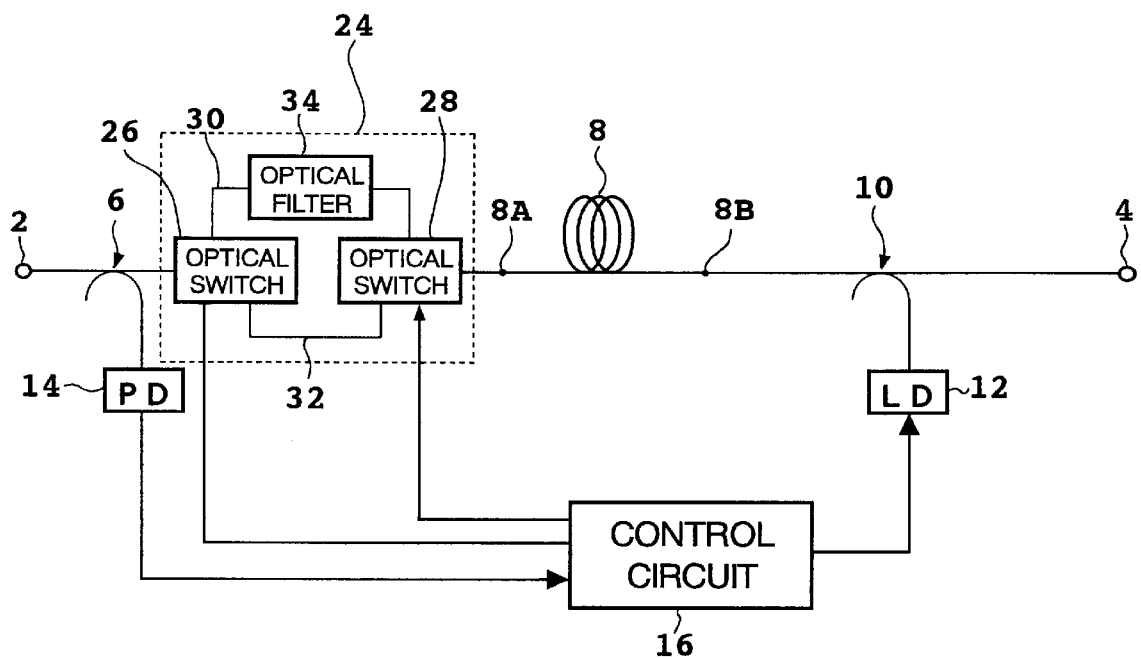
FIG. 3 is a block diagram showing a first preferred embodiment of the device according to the present invention.

FIG. 3 is a block diagram showing a first preferred embodiment of the device according to the present invention. The device according to the present invention is usable as an optical repeater in an optical fiber transmission system (this applies also to the following preferred embodiments). In contrast to the optical repeater shown in FIG. 1, the device shown in FIG. 3 comprises an optical filter unit 24 connected between the optical coupler 6 and the first end 8A of the EDF 8. The optical filter unit 24 includes an optical switch 26 connected to the optical coupler 6, an optical switch 28 connected to the first end 8A of the EDF 8, first and second optical paths 30 and 32 connected in parallel between the optical switches 26 and 28, and an optical filter 34 provided in the middle of the optical path 30. The optical filter 34 has a function of passing an optical signal to be supplied from the input port 2 to the EDF 8 and to be amplified in the EDF 8, and not passing residual pump light to be supplied from the EDF 8 to the input port 2. Accordingly, by interlockingly operating the optical switches 26 and 28, the optical filter unit 24 can selectively switch between a first condition where both the optical signal and the pump light are passed and a second condition where the optical signal is passed and the pump light is not passed. An optical bandpass filter or an optical bandstop filter may be used as the optical filter 34.

The control circuit 16 in this preferred embodiment has an additional function in relation to the optical filter unit 24, in addition to the above-mentioned function. As will be hereinafter described, a supervisory signal is superimposed on a main signal of the optical signal to be amplified, and the control circuit 16 can regenerate the supervisory signal according to the electrical signal supplied from the photodetector 14. By operating the optical switches 26 and 28 according to the regenerated supervisory signal, remote control of the optical filter unit 24 can be performed. Further, the supervisory signal may be updated according to the result of monitoring of the input optical power by the photodetector 14, and the updated supervisory signal may be transmitted to a downstream device (e.g., another optical repeater or a receiving terminal device). The transmission of the updated supervisory signal may be affected, for example, by a method of intensity-modulating the pump light to be output from the laser diode 12 according to the updated supervisory signal to thereby modulate the gain generated in the EDF 8 and superimpose the updated supervisory signal on the main signal.

For example, in the case of monitoring a splice loss in the vicinity of the input port 2 by remote operation, the optical switches 26 and 28 are operated according to the supervisory signal to select the first optical path 30. Accordingly, the optical signal supplied to the input port 2 and to be amplified in the EDF 8 is supplied through the optical filter 34 to the EDF 8, while the pump light from the laser diode 12 is normally supplied to the EDF 8, so that the operation of this device as an optical repeater is maintained. The residual pump light from the EDF 8 is stopped by the optical filter 34 and does not reach the input port 2. Accordingly, the splice loss can be monitored with the occurrence of Raman amplification on the input side of this device being inhibited. The input optical power to this device can be measured by the photodetector 14, and Gram in the above-mentioned equation is 0. Therefore, the splice loss can be obtained easily and accurately from the above-mentioned equation. After this monitoring, the optical switches 26 and 28 are operated according to the supervisory signal to select the second optical path 32, so that the input port 2 and the EDF 8 are brought into direct coupling with each other, thus allowing the transmission with the occurrence of Raman amplification by the residual pump light.

Figure 4:
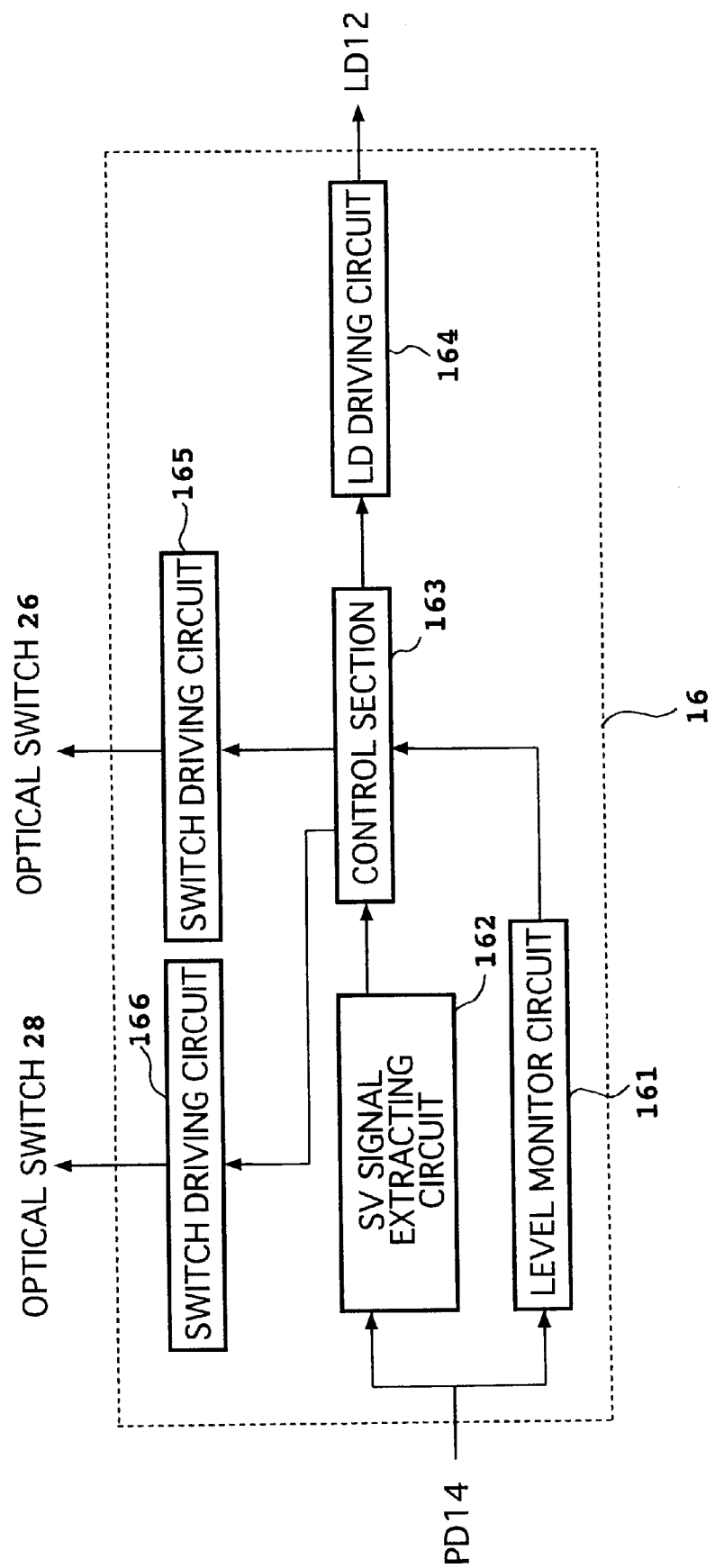
FIG. 4 is a block diagram showing a specific configuration of a control circuit in the first preferred embodiment.

The supervisory control in the first preferred embodiment will now be described more specifically with reference to FIGS. 4 and 5. FIG. 4 is a block diagram showing a specific configuration of the control circuit 16 in the first preferred embodiment, and FIG. 5 is a flowchart of the supervisory control in the first preferred embodiment.

As shown in FIG. 4, the control circuit 16 includes a level monitor circuit 161 and an SV signal extracting circuit 162 both receiving an output from the photodetector 14. The level monitor circuit 161 detects the level of the input optical power according to the output from the photodetector 14 and supplies the result of this detection to a control section 163. The SV signal extracting circuit 162 extracts a supervisory signal (SV signal) according to the output from the photodetector 14, and supplies the result of this extraction to the control section 163. For example, the SV signal is composed of a 10-bit digital signal indicating an address for identifying a repeater, and a 4-bit digital signal determining a control command to the repeater. An output from the control section 163 is supplied to an LD driving circuit 164 and switch driving circuits 165 and 166. The laser diode 12 for generating pump light is driven by the LD driving circuit 164, and the optical switches 26 and 28 are driven by the switch driving circuits 165 and 166, respectively.

Figure 5:
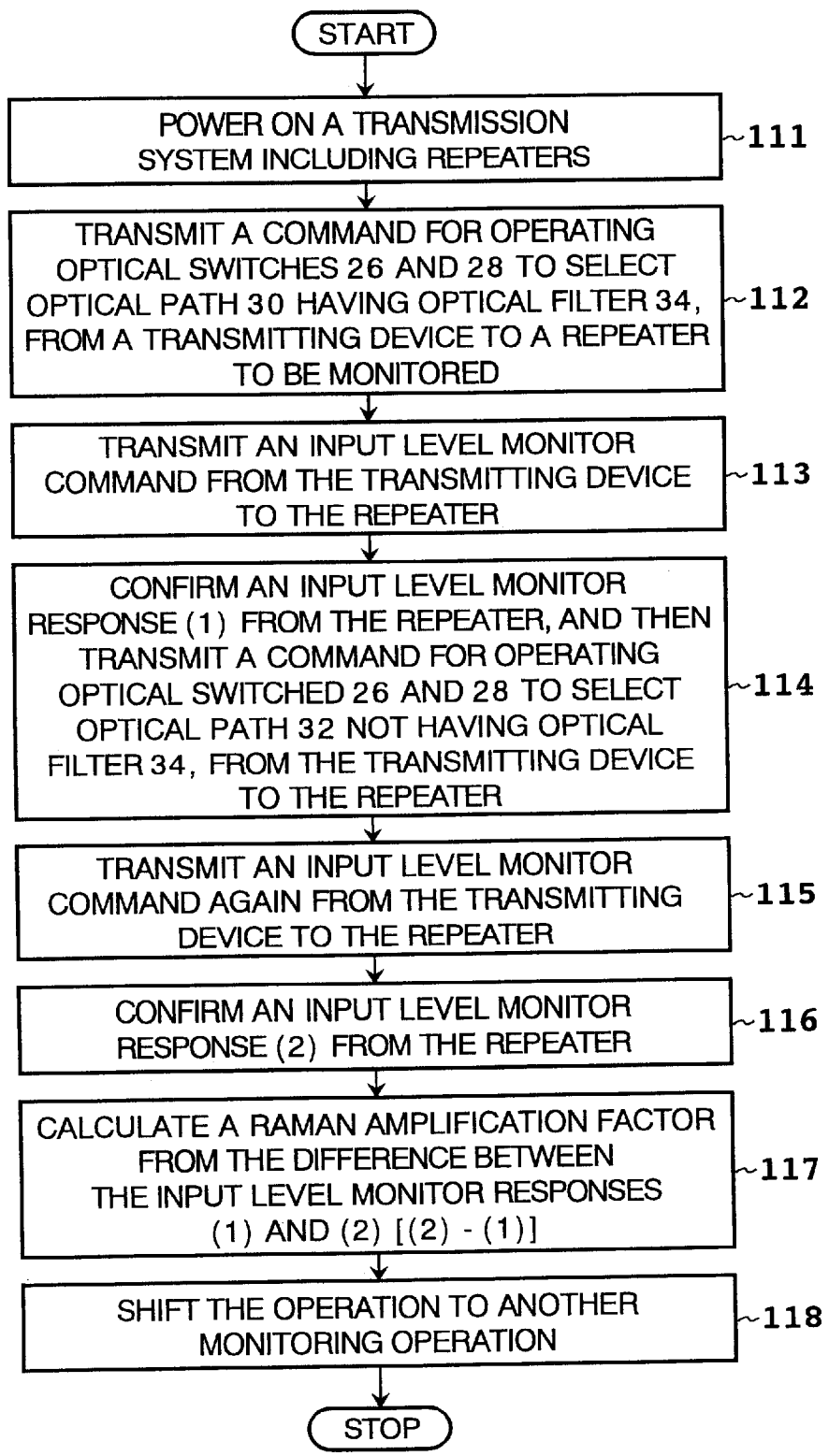
FIG. 5 is a flowchart of supervisory control in the first preferred embodiment.

Referring to FIG. 5, a transmission system including repeaters is powered on in step 111. In step 12, a command for operating the optical switches 26 and 28 to select the optical path 30 having the optical filter 34 is transmitted from a transmitting device to a repeater to be monitored.

In step 113, an input level monitor command is transmitted from the transmitting device to the repeater. In step 114, an input level monitor response (1) from the repeater is confirmed, and a command for operating the optical switches 26 and 28 to select the optical path 32 not having the optical filter 34 is then transmitted from the transmitting device to the repeater. In this stage, an input level not influenced by Raman amplification can be obtained.

In step 115, an input level monitor command is transmitted again from, the transmitting device to the repeater. In step 116, an input level monitor response (2) from the repeater is confirmed. In this stage, an input level with Raman amplification added can be obtained. In step 117, a Raman amplification factor is calculated from the difference between the input level monitor responses (1) and (2). In step 118, the operation is shifted to another monitoring operation.

As an initial condition, the optical switches 26 and 28 are automatically reset by powering on the system to have the positions selecting the optical path 32.

Figure 6:
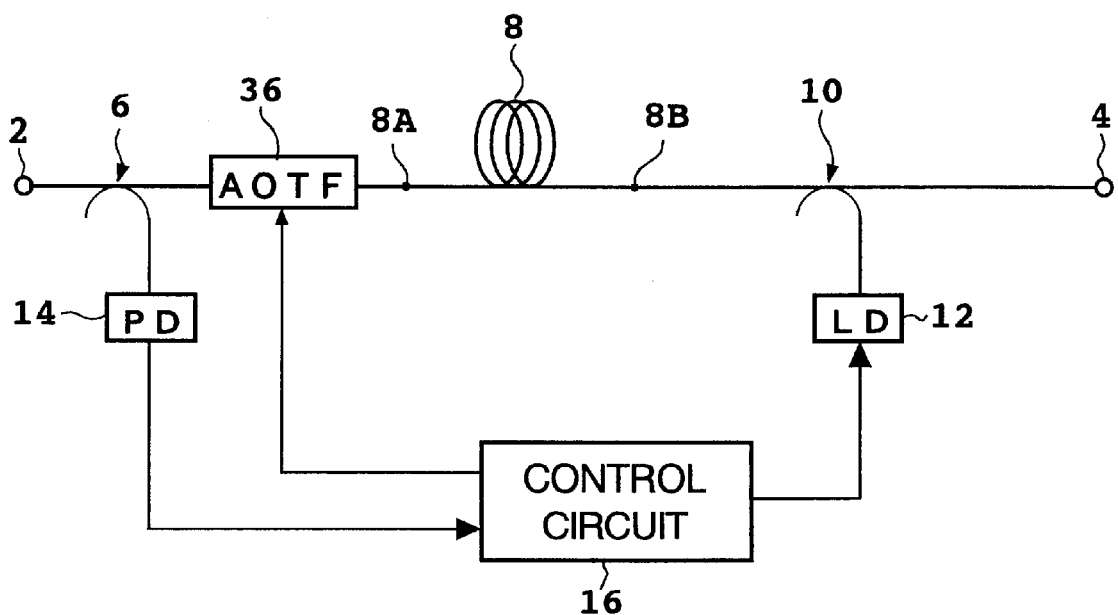
FIG. 6 is a block diagram showing a second preferred embodiment of the device according to the present invention.

FIG. 6 is a block diagram showing a second preferred embodiment of the device according to the present invention. In this preferred embodiment, an acousto-optic tunable filter (AOTF) 36 is used in place of the optical filter unit 24 shown in FIG. 3. The AOTF 36 may be obtained by forming an optical waveguide and a waveguide structure for surface acoustic waves (SAW) propagating in relation to this optical waveguide on a substrate. For example, an optical waveguide suitable for the AOTF 36 may be obtained by thermal diffusion of Ti on a LiNbO$_3$ substrate having birefringence of light. Further, to propagate surface acoustic waves in relation to the optical waveguide, an interdigital transducer (IDT) is formed on the substrate. By propagating surface acoustic waves in relation to the optical waveguide, mode conversion from a TE mode to a TM mode or vice versa is performed on light having a specific wavelength determined according to the power and frequency of the surface acoustic waves and the birefringence of the optical waveguide. Accordingly, by extracting the mode converted light through specific means such as a polarization beam splitter, different wavelength components of light can be obtained. This selective operation depends on the frequency of the surface acoustic waves, so that the wavelength of light passing through or not passing through the AOTF 36 becomes tunable according to the frequency of the surface acoustic waves.

Also by using the AOTF 36, the first condition where both the optical signal and the pump light are passed and the second condition where the optical signal is passed and the pump light is not passed can be selectively switched. Accordingly, by configuring the device so that the control circuit 16 controls the AOTF 36 according to the supervisory signal, the present invention can be carried out as in the preferred embodiment shown in FIG. 3.

Figure 7:
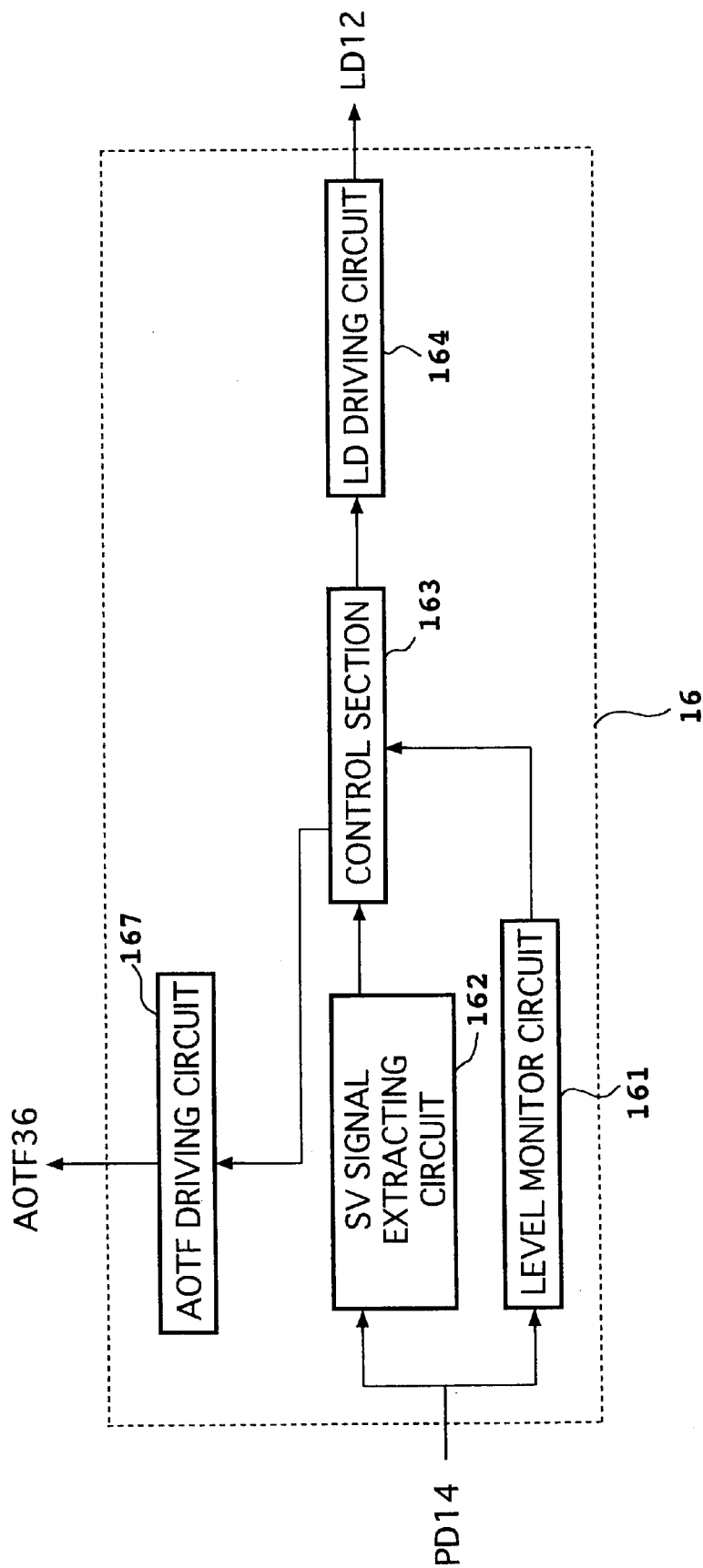
FIG. 7 is a block diagram showing a specific configuration of a control circuit in the second preferred embodiment.
Figure 8:
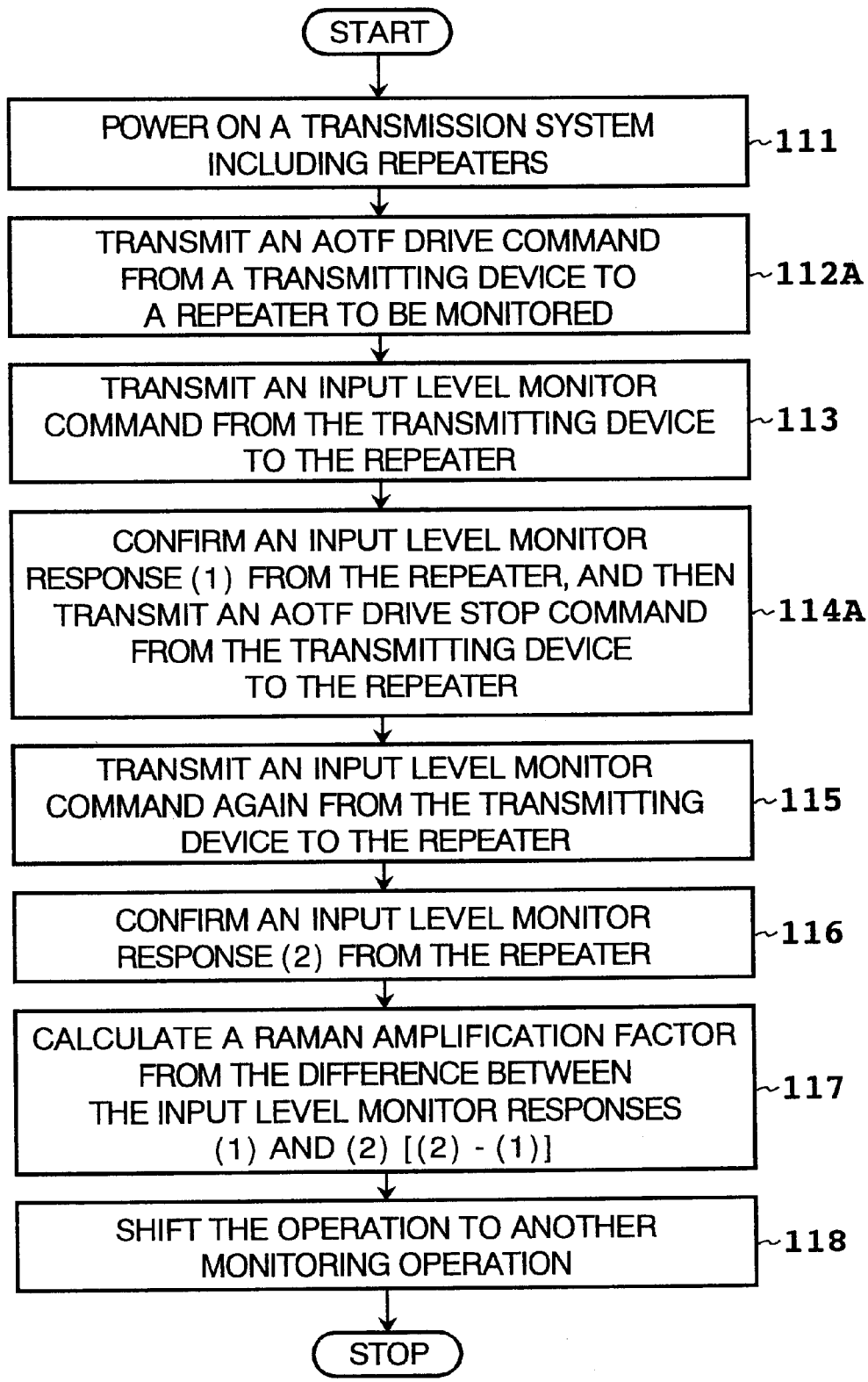
FIG. 8 is a flowchart of supervisory control in the second preferred embodiment.

FIG. 7 is a block diagram showing a specific configuration of the control circuit 16 in the second preferred embodiment, and FIG. 8 is a flowchart of the supervisory control in the second preferred embodiment.

In contrast to the preferred embodiment shown in FIG. 4, the control circuit 16 in the second preferred embodiment is illustrated, wherein an output from the control section 163 is supplied to an AOTF driving circuit 167 as shown in FIG. 7. The AOTF driving circuit 167 turns on/off the driving of the AOTF 36 according to a signal from the control section 163.

Referring to FIG. 8, the flow of the supervisory control in this preferred embodiment differs from that shown in FIG. 5 in that the steps 112 and 114 shown in FIG. 5 are changed to steps 112A an d 114A in FIG. 8, respectively. In step 112A, an AOTF drive command is transmitted from a transmitting device to a repeater to be monitored. In step 114A, an input level monitor response (1) from the repeater is confirmed, and an AOTF drive stop command is then transmitted from the transmitting device to the repeater. The other steps are similar to those of the flowchart shown in FIG. 5, so the description thereof will be omitted herein.

Figure 9:
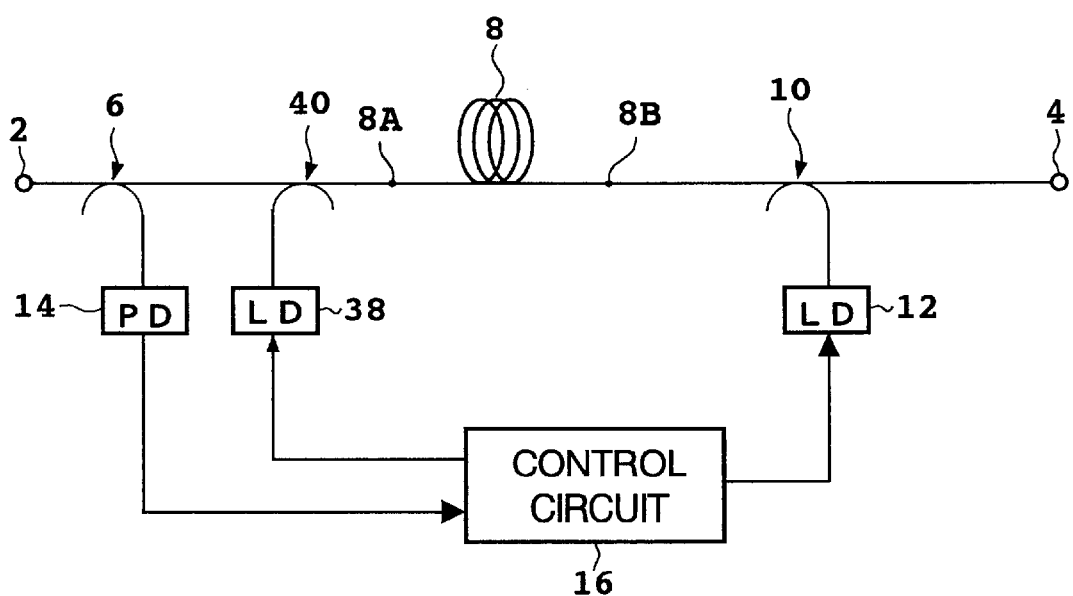
FIG. 9 is a block diagram showing a third preferred embodiment of the device according to the present invention.

FIG. 9 is a block diagram showing a third preferred embodiment of the device according to the present invention. In contrast to the preferred embodiment shown in FIG. 3, the third preferred embodiment omits the optical filter unit 24 and includes a laser diode 38 as a second pumping source. Pump light output from the laser diode 38 is supplied through an optical coupler 40 connected between the optical coupler 6 and the first end 8A of the EDF 8 into the EDF 8 from its first end 8A. Accordingly, the EDF 8 can be subjected to forward pumping by the pump light from the laser diode 38 (the pump light and the optical signal propagate in the same direction in the EDF 8) and backward pumping by the pump light from the laser diode 12 (the pump light and the optical signal propagate in opposite directions in the EDF 8). The operations of the laser diodes 12 and 38 are controlled by the control circuit 16 according to the supervisory signal received by the control circuit 16.

There will now be described a method of evaluating the characteristics of the optical fiber transmission line 20 by using the device shown in FIG. 9 as each of the optical repeaters 18(#1) and 18(#2) shown in FIG. 2. In the case of monitoring a splice loss on the input side of the optical repeater 18(#2) by remote operation, the laser diode 38 in the optical repeater 18(#1) is turned off by a supervisory signal, and the laser diode 12 in the optical repeater 18(#2) is turned off by a supervisory signal. In this case, the EDF 8 in the optical repeater 18(#1) is being pumped by the laser diode 12 in the optical repeater 18(#1), and the EDF 8 in the optical repeater 18(#2) is being pumped by the laser diode 38 in the optical repeater 18(#2), thereby allowing the transmission of an optical signal. Further, no residual pump light leaks from the optical repeaters 18(#1) and 18(#2) to the optical fiber transmission line 20 between the optical repeaters 18(#1) and 18(#2), so that Raman amplification does not occur. Accordingly, the loss at the splice connection point SC can be measured easily and accurately in accordance with the abovementioned equation, and the supervisory control relating to this monitoring and the transmission of the results of the supervisory control can be performed online.

After monitoring the splice loss, the laser diode 38 in the optical repeater 18(#1) is turned on by a supervisory signal, and the laser diode 12 in the optical repeater 18(#2) is turned on by a supervisory signal. As a result, a predetermined gain in the EDF 8 in each of the optical repeaters 18(#1) and 18(#2) can be obtained.

In the case of evaluating a splice loss on the output side of the-optical-repeater 18(#1), the laser diode 38 in the optical repeater 18(#1) is turned off to thereby allow the measurement in the condition where Raman amplification does not contribute.

The wavelength of the pump light to be output from the laser diode 38 for forward pumping the EDF 8 may be included in the 1.48-$\mu$m band which includes the wavelength of the pump light for backward pumping. Alternatively, the wavelength of the pump light to be output from the laser diode 38 may be included in a 0.98-$\mu$m band (0.96 to 1.0 $\mu$m). In this case, Raman amplification by this pump light to an optical signal having a wavelength included in the 1.55 $\mu$m band does not occur. Accordingly, it is not necessary to turn off the laser diode 38 in evaluating the characteristics of the optical fiber transmission line 20.

Figure 10:
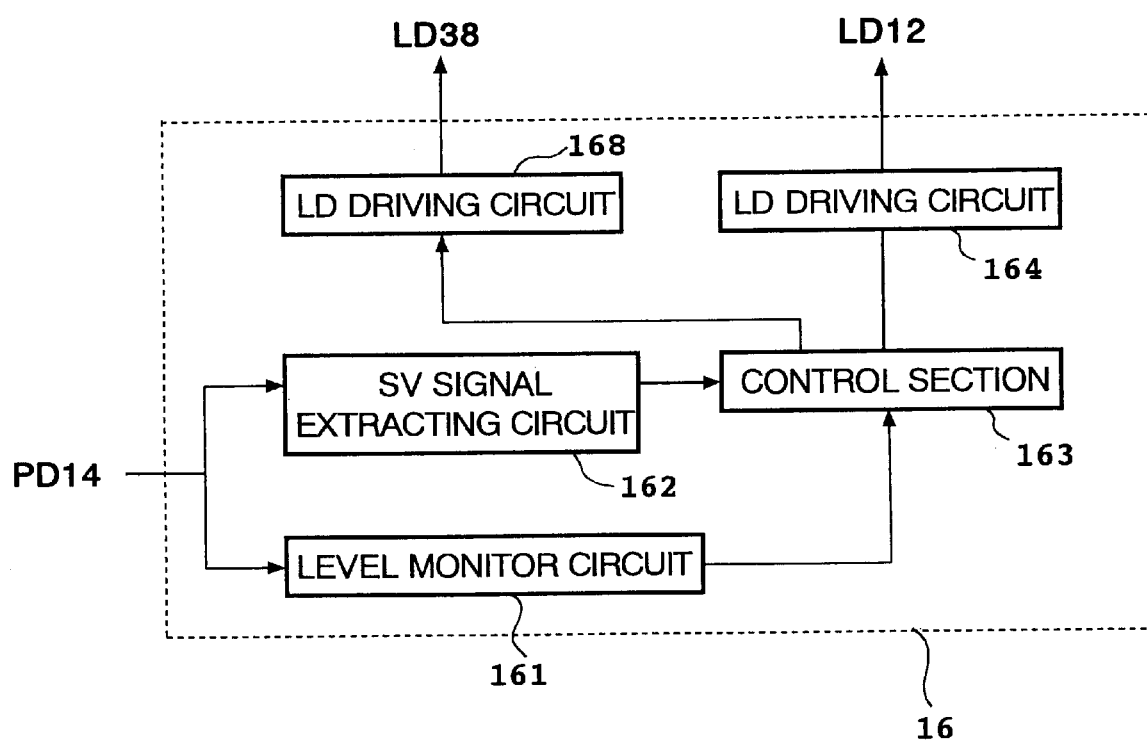
FIG. 10 is a block diagram showing a specific configuration of a control circuit in the third preferred embodiment.
Figure 11:
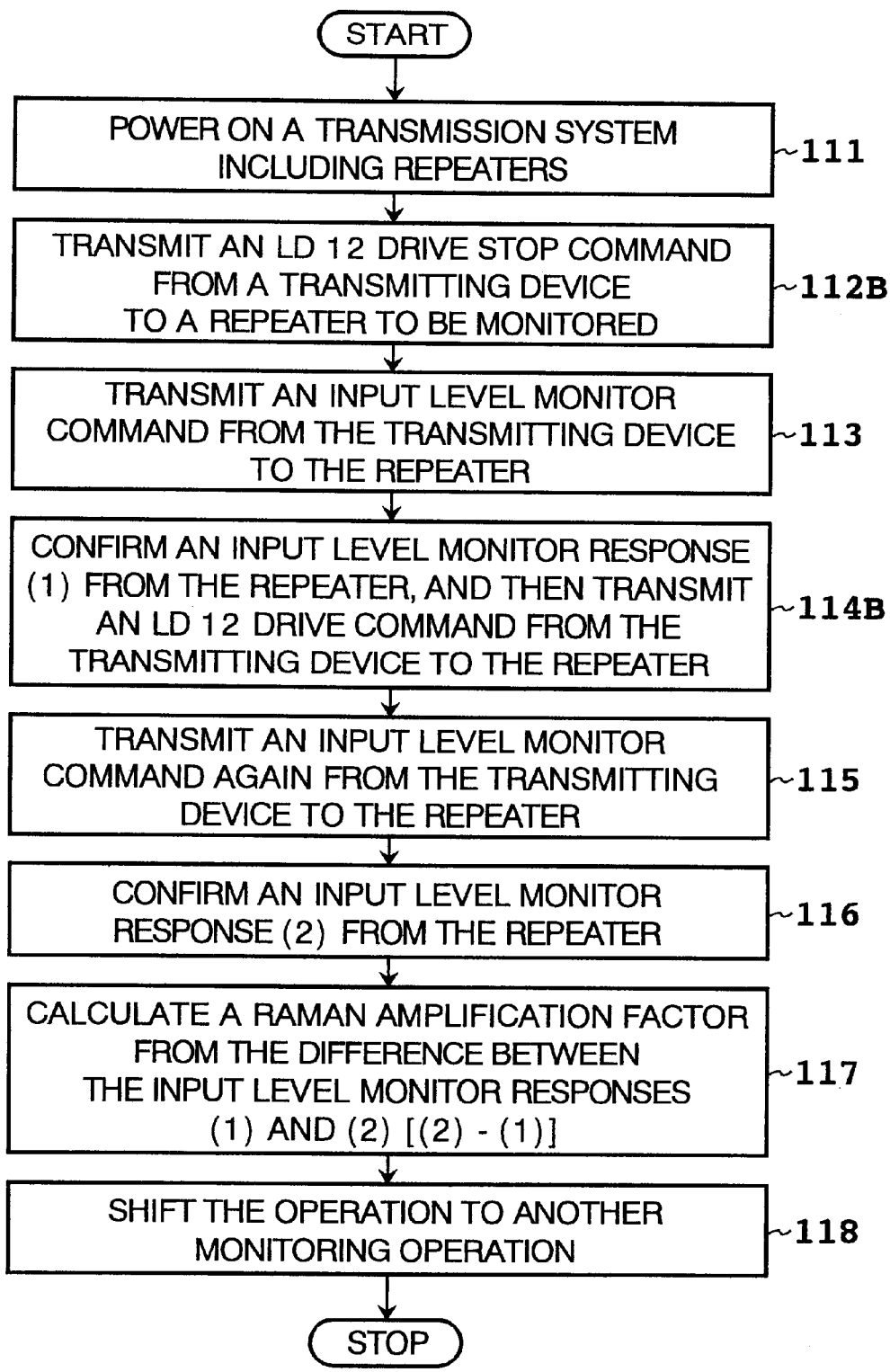
FIG. 11 is a flowchart of supervisory control in the third preferred embodiment.

FIG. 10 is a block diagram showing a specific configuration of the control circuit 16 in the third preferred embodiment of the present invention, and FIG. 11 is a flowchart of the supervisory control in the third preferred embodiment.

Referring to FIG. 10, the control circuit 16 in this preferred embodiment is illustrated wherein the control section 163 controls an LD driving circuit 168, in contrast to the control circuit 16 shown in FIG. 4 wherein the control section 163 controls the switch driving circuits 165 and 166. The LD driving circuit 168 drives the LD 38 for forward pumping.

Referring to FIG. 11, the flow of the supervisory control in this preferred embodiment differs from that shown in FIG. 5 in that the steps 112 and 114 shown in FIG. 5 are changed to steps 112B and 114B in FIG. 11, respectively. In step 112B, an LD 12 drive stop command is transmitted from a transmitting device to a repeater to be monitored. In step 114B, an input level monitor response (1) from the repeater is confirmed, and an LD 12 drive command is then transmitted from the transmitting device to the repeater. The other steps are similar to those of the flow shown in FIG. 5, so the description thereof will be omitted herein.

FIG. 12 is a block diagram showing a fourth preferred embodiment of the device according to the present invention. In contrast to the preferred embodiment shown in FIG. 9, the fourth preferred embodiment comprises an additional laser diode 42 as a pumping source for positively producing Raman amplification. Pump light having a wavelength included in the 1.48-$\mu$m band, for example, is output from the laser diode 42, and this pump light is passed through an optical coupler 44, the optical coupler 6, and the input port 2 in this order and then output to an optical fiber transmission line. Accordingly, in the case of using this device as the optical repeater 18(#2) shown in FIG. 2 and measuring the loss at the splice connection point SC on the input side of the optical repeater 18(#2), the laser diodes 12 and 42 are turned off to thereby allow the measurement in the condition where Raman amplification does not occur. In this case, the EDF 8 is being forward pumped by the pump light from the laser diode 38, so that the transmission of an optical signal through the optical repeater 18(#2) is allowed, and the monitoring by the supervisory control and the transmission of the monitoring result by a supervisory signal are also allowed.

FIG. 13 is a block diagram showing a specific configuration of the control circuit 16 in the fourth preferred embodiment, and FIG. 14 is a flowchart of the supervisory control in the fourth preferred embodiment.

Referring to FIG. 13, the control circuit 16 in this preferred embodiment comprises an additional LD driving circuit 169, in contrast to the control circuit 16 shown in FIG. 10. The LD driving circuit 169 drives the laser diode 42 as a pumping source for positively producing Raman amplification.

Referring to FIG. 14, the flow of the supervisory control in this preferred embodiment differs from that shown in FIG. 5 in that the steps 112 and 114 shown in FIG. 5 are changed to steps 112C and 114C in FIG. 14, respectively. In step 112C, an LD 12 and LD 42 drive stop command is transmitted from a transmitting device to a repeater to be monitored. In step 114C, an input level monitor response (1) from the repeater is confirmed, and an LD 12 and LD 42 drive command is then transmitted from the transmitting device to the repeater. The other steps are similar to those of the flow shown in FIG. 5, so the description thereof will be omitted herein.

FIG. 15 is a block diagram showing a first preferred embodiment of the system according to the present invention. This system includes a transmitting station 46 and a receiving station 48 each serving as a terminal device, an optical fiber transmission line 20 laid between the transmitting station 46 and the receiving station 48, and a plurality of (e.g., three as shown) optical repeaters 18(#1), 18(#2), and 18(#3) arranged along the optical fiber transmission line 20. Each of the optical repeaters 18(#1) to 18(#3) may be provided by the device according,to the present invention. The transmitting station 46 sends out an optical signal composed of a main signal as a service signal and a supervisory signal superimposed on the main signal to the optical fiber transmission line 20. The optical signal is amplified by each of the optical repeaters 18(#1) to 18(#3), and finally received by the receiving station 48.

Referring to FIG. 16, a transmitting method for the supervisory signal is shown. The main signal is shown by reference numeral 50, and the supervisory signal is shown by reference numeral 52. By intensity modulating the main signal 50 by several % of the amplitude of the main signal 50, the supervisory signal 52 lower in speed than the main signal 50 is superimposed thereon. As a modulation method using the supervisory signal as a carrier, ASK, FSK, PSK, etc. are adoptable. By using such a supervisory signal in the system shown in FIG. 15, for example, a remote control command can be transmitted from the transmitting station 46 to each of the optical repeaters 18(#1) to 18(#3), or to the receiving station 48. The remote control command includes an identification address preliminarily set for each of the optical repeaters 18(#1) to 18(#3), thereby allowing individual supervisory control for the optical repeaters 18(#1) to 18(#3).

Figure 17:
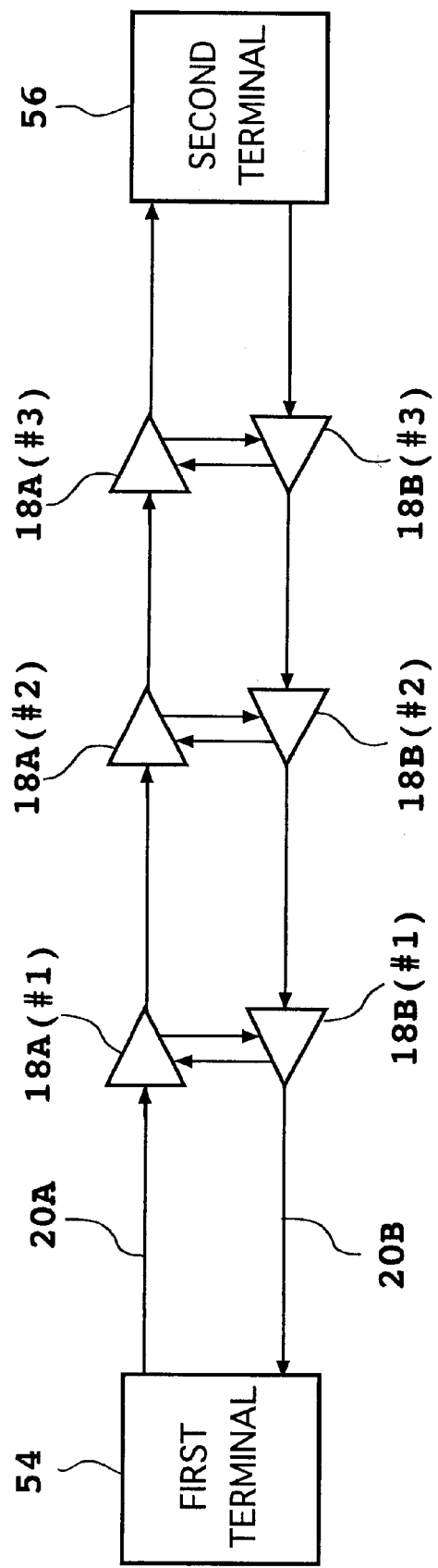
FIG. 17 is a block diagram showing a second preferred embodiment of the system according to the present invention.

FIG. 17 is a block diagram showing a second preferred embodiment of the system according to the present invention. This system includes first and second terminals 54 and 56, a down optical fiber transmission line 20A and an up optical fiber transmission line 20B both laid between the first and second terminals 54 and 56, a plurality of (e.g., three as shown) optical repeaters 18A(#1), 18A(#2), and 18A(#3) arranged along the down optical fiber transmission line 20A, and a plurality of (e.g., three as shown) optical repeaters 18B(#1), 18B(#2), and 18B(#3) arranged along the up optical fiber transmission line 20B. The optical repeaters 18A(#1) and the optical repeater 18B(#1) are provided in the same repeater housing. The optical repeater 18A(#2) and the optical repeater 18B(#2) are provided in the same repeater housing. The optical repeater 18A(#3) and the optical repeater 18B(#3) are provided in the same repeater housing. A supervisory signal can be exchanged between the optical repeaters provided in the same repeater housing.

Accordingly, in the case of carrying out the method according to the present invention, by using the system shown in FIG. 17, the optical repeater 18A(#1) receives a remote control command, for example, and performs monitoring according to this command. Then, the monitoring result may be transmitted to the second terminal 56 or may be transmitted to the first terminal 54 through the optical repeater 18B(#1) exchanging the supervisory signal. The transmission of the monitoring result may be effected by using the intensity modulation of pump light as mentioned previously.

It should be noted that the above preferred embodiments are merely illustrative and not limitative. For example, while the loss at the splice connection point is adopted as the characteristics of the optical fiber transmission line, the loss characteristics of the optical fiber transmission line itself may be evaluated in accordance with the present invention.

According to the present invention as described above, it is possible to provide a method, device, and system for accurately evaluating the characteristics of an optical fiber transmission line. The effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising the steps of:

connecting first and second optical amplifiers to a first end and a second end of an optical fiber transmission line, respectively, each of said first and second amplifiers comprising a doped fiber doped with a rare earth element, a first pumping source connected to a first end of said doped fiber for outputting first pump light, and a second pumping source connected to a second end of said doped fiber for outputting second pump light;

switching between a first condition where said first and second pumping sources of said first optical amplifier are turned off and on, respectively, and said first and second pumping sources of said second optical amplifier are turned on and off, respectively, and a second condition where said first and second pumping sources of said first optical amplifier are turned on, and said first and second pumping sources of said second optical amplifier are turned on; and evaluating the characteristics of said optical fiber transmission line according to the measurement of the power of said optical signal in said first condition.

2. A method according to claim 1, wherein said step of evaluating the characteristics of said optical fiber transmission line comprises the step of measuring the loss at a splice connection point included in said optical fiber transmission line.

3. A method according to claim 1, wherein:

said doped fiber comprises an erbium doped fiber;

said optical signal having a wavelength included in a 1.55-$\mu$m band;

said first pump light having a wavelength included in one of a 0.98-$\mu$m band and a 1.48-$\mu$m band;

said second pump light having a wavelength included in said 1.48-$\mu$m band.

4. A device comprising:

first and second optical amplifiers each comprising a doped fiber doped with a rare earth element, a first pumping source connected to a first end of said doped fiber for outputting first pump light, and a second pumping source connected to a second end of said doped fiber for outputting second pump light; and a control circuit that switches between a first condition where said first and second pumping sources of said first optical amplifier are turned off and on, respectively, and said first and second pumping sources of said second optical amplifier are turned on and off, respectively, and a second condition where said first and second pumping sources of said first optical amplifier are turned on, and said first and second pumping sources of said second optical amplifier are turned on, according to a supervisory signal.

5. A device according to claim 4, wherein:

said doped fiber comprises an erbium doped fiber;

said optical signal having a wavelength included in a 1.55-$\mu$m band;

said first pump light having a wavelength included in one of a 0.98-$\mu$m band and a 1.48-$\mu$m band;

said second pump light having a wavelength included in said 1.48-$\mu$m band.

6. A system comprising:

first and second optical amplifiers each comprising a doped fiber doped with a rare earth element, a first pumping source connected to a first end of said doped fiber for outputting first pump light and a second pumping source connected to a second end of said doped fiber for outputting second pump light;

an optical fiber transmission line having a first end and a second end respectively connected to said first and second optical amplifiers; and a control circuit that switches between a first condition where said first and second pumping sources of said first optical amplifier are turned off and on, respectively, and said first and second pumping sources of said second optical amplifier are turned on and off, respectively, and a second condition where said first and second pumping sources of said first optical amplifier are turned on, and said first and second pumping sources of said second optical amplifier are turned on, according to a supervisory signal.

7. A system according to claim 6, wherein:

said doped fiber comprises an erbium doped fiber;

said optical signal having a wavelength included in a 1.55-$\mu$m band;

said first pump light having a wavelength included in one of a 0.98-$\mu$m band and a 1.48-$\mu$m band;

said second pump light having a wavelength included in said 1.48-$\mu$m band.

8. A system according to claim 6, further comprising:

a terminal device connected to said optical fiber transmission line;

said terminal device comprising means for outputting a supervisory signal to be used in relation to said control circuit.

9. A system according to claim 6, wherein said second optical amplifier further comprises a third pumping source for supplying third pump light to said optical fiber transmission line so that Raman amplification is produced in said optical fiber transmission line.

* * * * *